United States Patent [19]

Narayanan et al.

[11] 3,910,940

[45] Oct. 7, 1975

[54] ANTHELMINTIC 5-(HETEROCYCLYL)-3-(ISOTHIOCYANO-PHENYL)OXADIAZOLES

[75] Inventors: Venkatachala L. Narayanan, Hightstown; Rudiger D. Haugwitz, Titusville, both of N.J.

[73] Assignee: E. R. Squibb & Sons, Inc., Princeton, N.J.

[22] Filed: Sept. 26, 1974

[21] Appl. No.: 509,512

Related U.S. Application Data

[62] Division of Ser. No. 347,312, April 2, 1973, Pat. No. 3,853,893.

[52] U.S. Cl............................ 260/302 H; 260/307 G
[51] Int. Cl.².................................. C07D 271/06
[58] Field of Search..................... 260/307 G, 302 H

[56] References Cited
UNITED STATES PATENTS
3,776,910   12/1973   Hagen et al................... 260/307 G Primary Examiner—Richard J. Gallagher
Attorney, Agent, or Firm—Lawrence S. Levinson; Merle J. Smith; Stephen B. Davis

[57] ABSTRACT

5-(Heterocyclyl)-3-(isothiocyanophenyl)oxadiazoles and related compounds and their methods of preparation are disclosed. In addition, useful compositions and methods for employing said compositions as anthelmintics are taught.

8 Claims, No Drawings

ANTHELMINTIC 5-(HETEROCYCLYL)-3-(ISOTHIOCYANO-PHENYL)OXADIAZOLES

This application is a division of Ser. No. 347,312 filed on Apr. 2, 1973, now U.S. Pat. No. 3,853,893.

This invention relates to compounds of the formula:

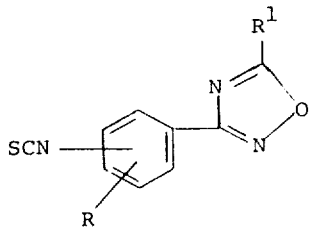

I wherein R is hydrogen, lower alkyl, aryl, halogen, trifluoromethyl, lower alkoxy, aryloxy, di(lower alkyl)amino and acetamido.

$R^1$ is a heterocyclic ring and pharmaceutically acceptable salts thereof.

In addition, this invention encompasses the methods for preparing said oxadiazoles, compositions containing said oxadiazoles and methods for using said compositions as anthelmintic agents.

Lastly, this invention is intended to also include the intermediates utilized in preparing said anthelmintic oxadiazoles.

The term "aryl" is intended to include phenyl, naphthyl, substituted phenyl wherein said substituent may be fluoro, chloro, bromo, iodo, nitro, trifluoromethyl, lower alkyl and lower alkoxy.

The term "lower alkyl" is intended to mean a straight or branched hydrocarbon fragment of from one to eight carbon atoms, such as methyl, propyl, t-butyl, etc.

The term "lower alkoxy" is intended to mean a lower alkyl group linked through a single bond to oxygen.

The term "halogen" is intended to mean "chloro," "bromo" or "fluoro."

The term "heterocyclic ring" is intended to mean a five or six membered heterocyclic ring containing from one to three heteroatoms, selected from the group consisting of oxygen, nitrogen and sulfur. Examples of such "heterocyclic rings" are thiophene, furan, thiazole, pyridine, pyrrole, pyrazine, imidazole, oxazole, morpholine, etc.

In addition, the term "heterocyclic ring from one to three heteroatoms selected from the group consisting of oxygen, nitrogen and sulfur" is intended to also encompass said heterocycles in their reduced form containing two, four, or six additional hydrogen atoms, such as N-methylpiperazine and said heterocycles which are substituted by a lower alkyl group or lower alkoxy group.

The term "pharmaceutically acceptable salts" is intended to mean the relatively nontoxic acid addition salts, such as the hydrochloride, sulfate, phosphate, acetate, maleate, citrate, etc.

The compounds of this invention are prepared in the following manner:

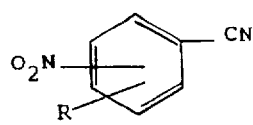

II

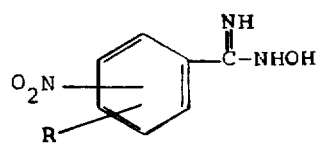

III

The nitrobenzonitriles of formula II are converted to amidoximes of the formula III by treatment with an acid salt of hydroxylamine, such as the hydrochloride, sulfate or phosphate in the presence of an acid acceptor, such as sodium or potassium carbonate. The reaction is generally conducted in an aqueous or non-aqueous alcohol solvent of up to four carbon atoms at from about room temperature to the reflux temperature of the solvent for periods of from 1 to 48 hours, preferably about 24 hours.

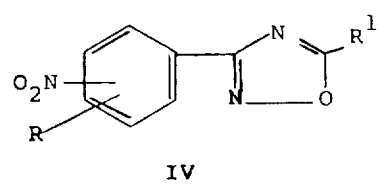

IV

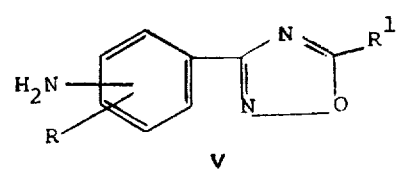

V

Oxadiazoles of the formula IV, wherein $R^1$ is a heterocyclic ring are prepared by heating a compound of the formula:

with a compound of formula III.

In many instances, the acylating agent may be used in excess thus also serving as the solvent medium; however, generally an inert organic solvent, such as benzene or ether is employed. The temperature range generally employed is either the refluxing temperature of the solvent or about 100°C whichever is the lesser, and the time ranges from about a few minutes to about 8 hours. This reaction is preferably conducted in the presence of a catalytic amount of $BF_3$-etherate.

Compounds of the type IV are converted to those of the formula V in poor yield, utilizing reducing agents such as $PtO_2/H_2$, $Na_2S_2O_{4/CH_3}OH$, $Pd/H_2$, $N_2H_4$, Pd/C, and $NaBH_2S_3/THF$. Surprisingly, catalytic reduction using about 5% Pd/C in the presence of about 2–5 equivalents of an acid, such as hydrochloric acid or sulfuric acid, gives good yields of amino compounds.

The conversion of the amines of formula V into the (isothiocyanophenyl)oxazoles (I) of this invention may be achieved by reacting the amine with:

a. in a relatively non-polar solvent, such as chloroform, ether, tetrahydrofuran, etc., preferably in the presence of an acid acceptor, such as calcium carbonate, trimethylamine, etc., at temperatures from 0° to 60°C. More specific reaction procedures are disclosed in HoubenWeyl, 4th Edition, Vol. 9, pages 867 and 88 (1955) and the use of acid binding agents is disclosed in Arch. Pharm. 295, 146–151 (1962).

b. N,N-di(lower alkyl)thiocarbamoyl halide, wherein said halo atom is chlorine or bromine, in an organic solvent, such as benzene, toluene, ethylene dichloride or chlorobenzene at temperatures of from about 40° to about 200°C [J. Org Chem 30, 2465 (1965)]

c. a bis-thiocarbamoyl sulfide of the formula

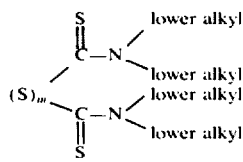

wherein $m$ is one or two and lower alkyl in preferably ethyl in the presence of an hydrogen halide at room temperature to the refluxing temperature of the organic solvent used, such as chlorobenzene [Helv. Chim. Acta 49, 1716 (1966)].

d. bis-trichloromethyl penta-thiodiperoxycarbomate wherein said amine is present in an excess (3:1) [Angew. Chem. 78, 985 (1966)].

e. ammonium rhodanide in the presence of gaseous hydrogen chloride in the manner shown in British Pat. No. 1,099,768.

f. phosgene and phosphorus pentasulfide in the general manner described in Houben-Weyl, 4th Edition, Vol. 9, pages 867 and 88 (1955).

g. carbon disulfide in the presence of an inorganic or organic base, such as triethylamine, potassium carbonate, etc. followed by oxidative dehydrosulphurisation with a metal salt (British Pat. No. 793,802) such as lead, copper, zinc or iron (III) salts, iodine, alkalimetal hypochlorites or chlorites, preferably the sodium or potassium salts (French Pat. No. 1,311,855), acid halides such as phosgene and phosphorus oxychloride [Chem. Ber. 98, 2425-2426 (1965)], chlorine and ammonium sulfide (DAS No. 1,198,189) or chloramine T (British Pat. No. 1,024,913).

h. ammonium rhodanide and benzoyl chloride, followed by thermal decomposition in a refluxing solvent such as chlorobenzene [Houben-Weyl, 4th Edition, 9, 867 and 88 1955)].

i. carbon disulfide, dicyclohexyl carbodiimide and a tertiary amine such as pyridine or triethylamine at temperatures of from about −10° to about 30°C for from about 0.5 to about 24 hours [Chem. Ber. 101, 1746 (1968)].

The publications cited for the introduction of the isothionato group are incorporated by reference.

The preferred compounds and starting materials prepared by the above procedures are those wherein R is hydrogen or chlorine and $R^1$ is thienyl thiazolyl, pyridyl, furyl or pyrryl.

The compounds described herein have anthelmintic activity and are useful in the treatment and/or prevention of helminthiasis, a parasitic disease which causes widespread and often serious infection in domesticated animals such as swine, horses, cattle, dogs, cats and sheep. While the compounds are preferably used in the treatment of hookworm (*Ancylostoma canium* and *Uncinaria stenocephala*) and roundworm (*Toxccara canis* and *Toxescaris leonina*), other compounds are also highly useful in treating infections caused by haemonchus, ostertagia, trichostrongylus, cooperia, nematodirus, bunostomum, strongylorides, oesophagostomum, trichiuris and moniezia. In treating domesticated animals, the compounds are given orally and may be mixed with a nontoxic, edible carrier to form a feed supplement, or be administered in unit dosage forms such as powders, capsule, tablet, boluses, drenches, etc.

In general, the compounds of this invention (I) exhibit anthelmintic activity when administered to animals in a daily dose of about 10 to about 200 mg per kilogram of animal body weight. It is preferred to employ in the range of 20–100 mg per kilogram of body weight per day. The compounds may be given in a single dose or divided into a plurality of smaller doses. When the compounds are to be employed primarily as prophylactic agents for the prevention of helminthic infections, the preferred daily dose level is, of course, lower than the therapeutic level is, preferably in the range of about 2–20 mg per kilogram of body weight.

When the compounds of this invention are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like and are compounded by techniques generally known in the art.

The compounds of this invention may also be administered as a component of the feed of the animals or suspended in the drinking water. Thus, novel feed and feed supplement compositions may be prepared in which the compounds of this invention are present as an active anthelmintic ingredient. A typical feed supplement comprises the anthelmintic agent (5–50%, preferably 10–30%) intimately dispersed in or admixed with an inert carrier or diluent, i.e., one that is nonreactive with respect to the anthelmintic agent and that may be administered with safety to the animals. The carrier or diluent is preferably one that is or may be an ingredient of an animal ration. This composition may be mixed with the feed to give any useful desired concentration, preferably about 0.1–2%. Lastly, feeds containing the active ingredient may be made directly by mixing said active ingredient in a feed which is inert to said anthelmintic compounds so as to give feeds having concentrations of anthelmintic agent of from 0.1–2%.

DETAILED DESCRIPTION

The following examples are provided for illustrative purposes and may include particular features of the invention; however, the examples should not be construed as limiting the invention, many variations of which are possible without departing from the spirit or scope thereof.

EXAMPLE 1 p-Nitrobenzamidoxime

A solution of 29.6 g (0.20 mole) of p-nitrobenzonitrile, 13.9 g (0.20 mole) of hydroxylamine, HCl, 13.8 g (0.10 mole) of $K_2CO_3$ in 700 ml of ethanol and 70 ml of $H_2O$ is refluxed for 20 hours, cooled and diluted with 200 ml of $H_2O$. After removal of the ethanol by distillation in vacuo, the product precipitates out of the aqueous residue. This product is collected by filtration, washed with $H_2O$ and dried to yield 21.6 g (60%).

EXAMPLES 2–8

Substituted-nitrobenzamidoximes

According to the procedures described in example 1, upon substituting in place of p-nitrobenzonitrile, one of the following:
2-nitro-3-methylbenzonitrile,
3-nitro-2-chlorobenzonitrile,
4-nitro-3-trifluoromethylbenzonitrile,
4-nitro-2-ethoxybenzonitrile,
2-nitro-4-phenylbenzonitrile,
2-nitro-4-dimethylaminobenzonitrile, and 3-nitro-4-acetamidobenzonitrile,
one obtains:
2-nitro-3-methylbenzamidoxime,
3-nitro-2-chlorobenzamidoxime,
4-nitro-3-trifluoromethylbenzamidoxime,
4-nitro-2-ethoxybenzamidoxime,
2-nitro-4-phenylbenzamidoxime,
2-nitro-4-dimethylaminobenzamidoxime, and
3-nitro-4-acetamidobenzamidoxime,
respectively.

EXAMPLE 9

5-(2-Thienyl)-3-(p-nitrophenyl)-1,2,4-oxadiazole

To a solution of 9.1 g (0.05 mole) of p-nitrophenylacetamidoxime in 300 ml of dioxane, is added 7.4 g (0.05 mole) of 2-thiophenecarboxylic acid chloride. After stirring at r.t. for 10 minutes, 2 ml of $BF_3$—$Et_2O$ is added, and the mixture is then refluxed for 18 hours. The reaction mixture is then cooled followed by addition of $H_2O$. The resulting precipitate is collected by filtration and washed with $Et_2O$ to yield 8.4 g of product (61%).

EXAMPLE 10

5-(4-thiazole)-3-(p-nitrophenyl)-1,2,4-oxadiazole

A solution of 2.0 g (0.02 mole) of 4-thiazolecarboxylic acid in 15 ml of thionyl chloride is refluxed for 2 hours. The thionyl chloride is then removed by distillation in vacuo, and the resulting solid residue is washed with a small amount of Pet. $Et_2O$. This acid chloride is then added to a solution of 2.9 g (0.02 mole) of p-nitrophenyl acetamidoxime and 1.0 ml of $BF_3$—$Et_2O$ in 100 ml of dioxane, and the resulting mixture is refluxed overnight. The reaction mixture is then cooled followed by the addition of $H_2O$. The precipitated product is collected by filtration and washed with $Et_2O$ to yield 3.1 g (70%).

EXAMPLES 11–17

5-(heterocyclyl)-3-(p-nitrophenyl)-1,2,4-oxadiazole

According to the procedure of example 9, upon substituting in place of p-nitrophenylacetamidoxime, one of the following:
2-nitro-3-methylbenzamidoxime,
. 3-nitro-2-chlorobenzamidoxime,
4-nitro-3-trifluoromethylbenzamidoxime,
4-nitro-2-ethoxybenzamidoxime,
2-nitro-4-phenylbenzamidoxime,
2-nitro-4-dimethylaminobenzamidoxime, and
3-nitro-4-acetamidobenzamidoxime,
one obtaines:
5-(2-thienyl)-3-(2-nitro-3-methylphenyl)-1,2,4-oxadiazole,
5-(2-thienyl)-3-(3-nitro-2-chlorophenyl)-1,2,4-oxadiazole,
5-(2-thienyl)-3-(4-nitro-3-trifluorophenyl)-1,2,4-oxadiazole,
5-(2-thienyl)-3-(4-nitro-2-ethoxyphenyl)-1,2,4-oxadiazole,
5-(2-thienyl)-3-(2-nitro-4-phenylphenyl)-1,2,4-oxadiazole,
5-(2-thienyl)-3-(2-nitro-4-dimethylaminophenyl)-1,2,4-oxadiazole, and
5-(2-thienyl)-3-(3-nitro-4-acetamidophenyl)-1,2,4-oxadiazole
respectively.

EXAMPLE 18

Isothiocyanic acid, p-[5-(2-thienyl)-1,2,4-oxadiazol 3-yl]phenyl ester, hydrate (1:1)

A suspension of 4.0 g (0.02 mole) of 5-(2-thienyl)-3-(p-nitrophenyl)-1,2,4-oxadiazole in 200 ml of 95% ethanol containing 0.4 g of 5% Pd/C and 2 ml of conc. HCl was hydrogenated at 50 psi over a period of 1 hour. The catalyst was removed by filtration followed by removal of the ethanol by distillation in vacuo. The resulting residue was taken up in a mixture of 100 ml of $CHCl_3$, and 30 ml of $H_2O$ containing 2.0 g (0.02 mole) of $CaCO_3$. This mixture was cooled to 0° followed by the addition of 1.8 g (0.02 mole) of $CSCl_2$. After stirring for 15 minutes at this temperature, the ice bath was removed and the mixture was allowed to stir for an additional 0.5 hour. The reaction mixture was then filtered and the organic layer was separated, washed with $H_2O$ and dried over $CaCl_2$. After removing the drying agent, the $CHCl_3$ was removed by distillation in vacuo to yield a solid residue. This residue was washed with pet ether-$Et_2O$ to yield 1.5 g of product (35%). Recrystallization from pet ether-$Et_2O$ yielded an analytical sample, mp 148°–150°.

EXAMPLE 19

Isothiocyanic acid, p-[5-(4-thiazolyl)-1,2,4-oxadiazol-3-yl]-phenyl ester

A suspension of 2.0 g (0.01 mole) of 5-(4-thiazole)-3-(p-nitrophenyl)-1,2,4-oxadiazole, 0.2 g of 5% Pd/C and 1.0 ml of conc. HCl in 200 ml of EtOH was hydrogenated at 50 psi over a period of 1 hour. The resulting amine was reacted with 1.2 g (0.01 mole) of $CSCl_2$ and 1.2 g (0.01 mole) of $CaCO_3$ in a mixture of 100 ml of CHCl₃ and 30 ml of H₂O. The product yield was 0.9 g (43%).

EXAMPLE 20

Isothiocyanic acid,
p-[5-(2-furyl)-1,2,4-oxadiazole-3-yl]-phenyl ester

This synthesis was carried out as described in example 18. A suspension of 5.1 g (0.02 mole) of 3-(p-nitrophenyl)-5-(2-furyl)-1,2,4-oxadiazole, 0.5 g of 5% Pd/C and 2 ml of conc. HCl in 200 ml of EtOH is hydrogenated at 50 psi over a period of 1 hour. The resulting amine is reacted with 2.5 g (0.02 mole) of CSCl₂ and 2.5 g (0.03 mole) of CaCO₃ in a mixture of 100 ml of CHCl₃ and 30 ml of H₂O. The reaction yields 3.1 g (57%) of product. Recrystallization from petroleum ether—Et₂O yields an analytical sample, mp 137°–140°.

EXAMPLES 21 –27

Isothiocyanic acid,
p-[5-(2-thienyl)-1,2,4-oxadiazol-3-yl]-phenyl esters

According to the procedure of example 18, upon substituting in place of 5-(2-thienyl)-3-(p-nitrophenyl)-1,2,4-oxadiazole, one of the following:

5-(2-thienyl)-3-(2-nitro-3-methylphenyl)-1,2,4-oxadiazole,
5-(2-thienyl)-3-(3-nitro-2-chlorophenyl)-1,2,4-oxadiazole,
5-(2-thienyl)-3-(4-nitro-3-trifluorophenyl)-1,2,4-oxadiazole,
5-(2-thienyl)-3-(4-nitro-2-ethoxyphenyl)-1,2,4-oxadiazole,
5-(2-thienyl)-3-(2-nitro-4-phenylphenyl)-1,2,4-oxadiazole,
5-(2-thienyl)-3-(2-nitro-4-dimethylaminophenyl)-1,2,4-oxadiazole, and
5-(2-thienyl)-3-(3-nitro-4-acetamidophenyl)-1,2, 4-oxadiazole, one obtains:
isothiocyanic acid, 2-(5-(2-thienyl)-1,2,4-oxadiazol-3-yl)-6-methylphenyl ester,
isothiocyanic acid, 3-(5-(2-thienyl)-1,2,4-oxadiazol-3-yl)-2-chlorphenyl ester,
isothiocyanic acid, 4-(5-(2-thienyl)-l1,2,4-oxadiazol-3-yl)-2-trifluoromethylphenyl ester,
isothiocyanic acid, 4-(5-(2-thienyl)-1,2, 4-oxadiazol-3-yl)-3-ethoxyphenyl ester,
isothiocyanic acid, 2-(5-(2-thienyl)-1,2, 4-oxadiazol-3-yl)-5-(phenyl)phenyl ester,
isothiocyanic acid, 2-(5-(2-thienyl)-1,2,4-oxadiazol-3-yl)-5-dimethylaminophenyl ester,
isothiocyanic acid, 3-(5-(2-thienyl)-1,2,4-oxadiazol-3-yl)-6-acetamidophenyl ester,
respectively.

EXAMPLE 28

5-(2-pyridyl)-3-(p-nitrophenyl)-1,2,4-oxadiazole

To a solution of 3.6 g (0.02 mole) of p-nitrobenzamidoxime in 250 ml dioxane there is added 4.0 g of picolinic acid chloride and the mixture is stirred at room temperature for 5 minutes until a precipitate is formed. After the addition of 0.5 ml of BF₃—Et₂O, the mixture is refluxed for 18 hours. The precipitate which forms upon cooling is filtered off, dried and crystallized from EtOH to yield 3.2 g (60%) of product, mp 202°–203°.

EXAMPLE 29

5-(3-pyridyl)-3-(p-nitrophenyl)-1,2, 4-oxadiazole hydrochloride

Following the above procedure, the reaction of 9.0 g (0.05 mole) of p-nitrobenzamidoxime, 9.0 g (0. 05 mole) of nicotinic acid chloride hydrochloride, and 3 ml of BF₃ —Et₂O yields 12.3 g (80%) of product, mp > 280°.

EXAMPLE 30

5-(4-pyridyl)-3-(p-nitrophenyl)-1,2,4-oxadiazole hydrochloride

Following the above procedure, the reaction of 9.0 g (0.05 mole) of p-nitrobenzamidoxime, 7.1 g (0.05 mole) of isonicotinic acid chloride, and 3 ml BF₃—Et₂O yields 11.6 g (75%) of product, mp 238°–240°.

EXAMPLE 31

Isothiocyanic acid,
p-[5-(2-pyridyl)-1,2,4-oxadiazol-3-yl] phenyl ester

A. A mixture of 2.68 g (0.01 mole) of 5-(2-pyridyl)-3-(p-nitrophenyl)-1,2,4-oxadiazole, 10 ml 10% HCl, 190 ml abs EtOH, and 0.27 g of 5% Pd/C is reduced on the Parr hydrogenator at 50 psi until the required amount of H₂ is absorbed. The mixture is filtered and the solid thus isolated is basified (K₂CO₃) and extracted with CHCl₃. The organic layer is dried (MgSO₄) and evaporated. The solid residue is dissolved in 80 ml glyme and 40 ml H₂O. 1.0 g (0.01 mole) of CaCO₃ and then 0.8 ml (0.01 mole) of thiophosgene is added dropwise at 0°C. The mixture is stirred for 1 hour and then the glyme removed in vacuo at room temperature. The solid is filtered off, dried, and crystallized from CHCl₃—Et₂O to yield 1.5 g (54%), mp 143°–145°.

B. A mixture of 0.36 g of sodium borohydride and 0.96 g of sulphur in 50 ml of tetrahydrofuran (THF) is stirred for 0.5 hours at room temperature. A well-stirred suspension of 2.68 g (0.01 mole) of 5-(2-pyridyl)-3-(p-nitrophenyl)-1,2,4-oxadiazole in 100 ml of THF is added slowly to the above solution of NaBH₂S₃/THF and the mixture is refluxed for 24 hours. The solvent is evaporated in vacuo, the residue stirred with 250 ml of ether and extracted with 10% HCl. The acidic layer is basified (K₂CO₃) and extracted with CHCl₃. The organic layer is dried (mgSO₄) and evaporated. The solid residue is dissolved in 80 ml glyme and 40 ml H₂O. 1.0 g (0.01 mole) of CaCO₃ and then 0.8 ml (0.01 mole) of thiophosgene is added dropwise at 0°C. The mixture is stirred for 1 hour and then the glyme removed in vacuo at room temperature. The solid is filtered off, dried, and crystallized from CHCl₃—Et₂O to yield 1.5 g (54%), mp 143°–145°.

EXAMPLE 32

Isothiocyanic acid,
p-[5-(3-pyridyl)-1,2,4-oxadiazol-3-yl]phenyl ester

Following the above procedure, of Example 31A, the reaction of 3.0 g of 5-(3-pyridyl)-3-(p-nitrophenyl)-1,2,4-oxadiazole hydrochloride, 0.3 g of 5% Pd/C, 5 ml of 10% HCl, 1.0 g of Ca CO₃ and 0.8 ml of thiophosgene yields 0.3 g (10%) of product, mp 100°–104°.

EXAMPLE 33

Isothiocyanic acid,
p-[5-(4-pyridyl)-1,2,4-oxadiazol-3-yl]phenyl ester

Following the above procedure, of Example 31A, the reaction of 3.0 g of 5-(4-pyridyl)-3-(p-nitrophenyl)-1,2,4-oxadiazole hydrochloride, 0.3 g of 5% Pd/C, 5 ml of 10% HCl, 1.0 g of CaCO$_3$, and 0.8 ml of thiophosgene yields 0.5 g (16%) of product, mp 143°–146°.

What is claimed is :

1. A compound of the formula:

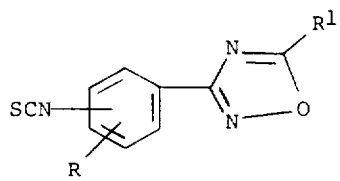

wherein R is selected from the group consisting of hydrogen, chlorine, bromine, fluorine, lower alkyl, lower alkoxy, phenyl, trifluoromethyl, di(lower alkyl)amino, and acetamido; R$^1$ is selected from the group consisting of thienyl, thiazolyl, furyl and pyrryl; and pharmaceutically acceptable salts thereof.

2. The compound of claim 1 wherein R is selected from the group consisting of chlorine and hydrogen.

3. The compound of claim 2 wherein R is hydrogen and R$^1$ is 2-thienyl.

4. The compound of claim 2 wherein R is hydrogen and R$^1$ is 4-thiazolyl.

5. The compound of claim 2 wherein R is hydrogen and R$^1$ is 2-furyl.

6. The compound of claim 3, isothiocyanic acid, p-[5-(2-thienyl)-1,2,4-oxadiazol-3-yl]phenyl ester, hydrate.

7. The compound of claim 4, isothiocyanic acid, p-[5-(4-thiazolyl)-1,2,4-oxadiazol-3-yl]phenyl ester.

8. The compound of claim 5, isothiocyanic acid, p-[5-(2-furyl)-1,2,4-oxadiazol-3-yl]phenyl ester.

* * * * *

UNITED STATES PATENT AND TRADEMARK OFFICE
CERTIFICATE OF CORRECTION

PATENT NO. : 3,910,940
DATED : 10/7/75
INVENTOR(S) : Narayanan, Venkatachala L. et al It is certified that error appears in the above-identified patent and that said Letters Patent are hereby corrected as shown below:

Col. 2, line 66, "$Na_2S_2O_4/CH_3OH$" should read --$Na_2S_2O_4/CH_3OH$--.

Col. 3, between lines 6 and 10, cancel "$Cl\overset{\overset{S}{\|}}{C}Cl$".

Col. 3, line 11, after "a." insert --$Cl\overset{\overset{S}{\|}}{C}Cl$--.

Col. 7, line 6, "oxadiazole" should read --oxadiazol--.

Col. 7, line 44, "chlorphenyl" should read --chlorophenyl--.

Col. 7, line 45, "11,2,4" should read --1,2,4--.

Col. 8, line 50, "($mgSO_4$)" should read --($MgSO_4$)--.

Signed and Sealed this thirtieth Day of March 1976

[SEAL]

Attest:

RUTH C. MASON
Attesting Officer

C. MARSHALL DANN
Commissioner of Patents and Trademarks